(12) United States Patent
Maalouly et al.

(10) Patent No.: US 11,690,479 B2
(45) Date of Patent: Jul. 4, 2023

(54) COOKING APPARATUS WITH REFUEL CHUTE

(71) Applicant: Desora, Inc., Cambridge, MA (US)

(72) Inventors: Michel Nicholas Maalouly, Cambridge, MA (US); Elizabeth Olayinka Ogunbiyi, Cambridge, MA (US)

(73) Assignee: Desora, Inc., Cambridge, MA (US)

( * ) Notice: Subject to any disclaimer, the term of this patent is extended or adjusted under 35 U.S.C. 154(b) by 583 days.

(21) Appl. No.: 16/610,719

(22) PCT Filed: Apr. 30, 2018

(86) PCT No.: PCT/US2018/030230
§ 371 (c)(1),
(2) Date: Nov. 4, 2019

(87) PCT Pub. No.: WO2018/204265
PCT Pub. Date: Nov. 8, 2018

(65) Prior Publication Data
US 2020/0163491 A1    May 28, 2020

Related U.S. Application Data

(60) Provisional application No. 62/502,356, filed on May 5, 2017.

(51) Int. Cl.
*A47J 37/07* (2006.01)
*A23B 4/052* (2006.01)

(52) U.S. Cl.
CPC .......... *A47J 37/0786* (2013.01); *A23B 4/052* (2013.01); *A47J 37/0704* (2013.01); *A23V 2002/00* (2013.01); *A47J 2203/00* (2013.01)

(58) Field of Classification Search
CPC .. A23B 4/052; A23V 2002/00; A47J 2203/00; A47J 37/0704; A47J 37/0786; A47J 37/079
USPC ........................................................... 99/339
See application file for complete search history.

(56) References Cited

U.S. PATENT DOCUMENTS

| 8,490,614 B1 * | 7/2013 | Gregory | A47J 37/0754 126/41 R |
| 2013/0206015 A1 * | 8/2013 | Jacoby | A47J 37/07 99/330 |
| 2017/0290465 A1 * | 10/2017 | Barrow | A47J 37/0704 |

FOREIGN PATENT DOCUMENTS

| WO | WO-2010/116183 | 10/2010 |
| WO | WO-201 2/123875 | 9/2012 |

OTHER PUBLICATIONS

ISR and Written Opinion for PCT Application No. PCT/US2018/030230 dated Oct. 18, 2018. 6 pages.

(Continued)

*Primary Examiner* — Dana Ross
*Assistant Examiner* — Joseph W Iskra
(74) *Attorney, Agent, or Firm* — Foley & Lardner LLP

(57) ABSTRACT

A barbecue smoker device for cooking food includes a container, a heat source disposed in the container, and a fuel chute coupled to the container. The fuel chute includes a door panel, a hinge mechanism, and a back panel coupled to the door panel. The fuel chute is rotatable between an open position and a closed position. In the open position the fuel chute receives a supply of fuel, and in the closed position the fuel chute directs the supply of fuel to a fuel basket.

23 Claims, 3 Drawing Sheets

(56) References Cited

OTHER PUBLICATIONS

International Preliminary Report on Patentability for International Application No. PCT/US2018/030230, dated Nov. 5, 2019, 4 pages.

* cited by examiner

COOKING APPARATUS WITH REFUEL CHUTE

CROSS-REFERENCE TO RELATED APPLICATIONS

This application is a National Stage Application of International Application No. PCT/US2018/30230, filed Nov. 8, 2018, which claims priority to and the benefit of U.S. Provisional Application No. 62/502,356, filed on May 5, 2017, which are incorporated herein by reference in their entirety.

BACKGROUND

The present disclosure relates generally to the field of cooking apparatuses. The present disclosure relates more specifically to a barbecue smoker cooking apparatus with a refuel chute configured to permit a user to add fuel to the apparatus during the cooking process with minimum adverse effects on the cooking process.

Smoking and grilling are common methods for cooking food. In the grilling method, food is quickly cooked at relatively high heat by directly applying heat from a heat source such as coal or gas. By contrast, in the smoking method, food is flavored and slow-cooked at relatively low heat by exposing it to smoke in a closed container called a smoker. The smoke is usually produced by wood exposed to a heat source such as coal or propane. The wood itself may also be used as a heat source.

There are a number of types of dedicated smoker barbecues used to create this environment. They generally comprise, among other components: a fuel support for charcoal or wood adjacent the lower part of the barbecue, an optional water support pan above the fuel support, and a grill supporting the food to be cooked above the water pan. It can be difficult to achieve optimal results during smoking of food due in part to the long duration of smoking (e.g., a 12 hour smoking time is common for some cuts of meat) over which conditions inside the smoke and ambient conditions may change dramatically, resulting in temperature variations that may lead to poor results in terms of quality of smoked meat.

One change of condition can occur when the smoker heat source runs out of fuel, causing the temperature in the smoker to fall. It is typical for fuel to be added at least once during a long period of smoking. However, adding fuel can impede the cooking process, because the lid and food platform often need to be removed in order to access the heat source. Removing the lid of the smoker causes an influx of cold air into the smoker, resulting in temperature surges and poor ability to control the cooking temperature. In addition, traditional mechanisms of refueling provide no reliable means to ensure that added fuel is directed toward the heat source. Thus, a barbecue smoker cooking apparatus with a refueling chute that minimizes that temperature effects of refueling and guides the fuel into a fuel container would be useful.

DETAILED DESCRIPTION

Before turning to the FIGURES, which illustrate the embodiments in detail, it should be understood that the disclosure is not limited to the details or methodology set forth in the description or illustrated in the figures. It should also be understood that the terminology is for the purpose of description only and should not be regarded as limiting.

Figure 1:
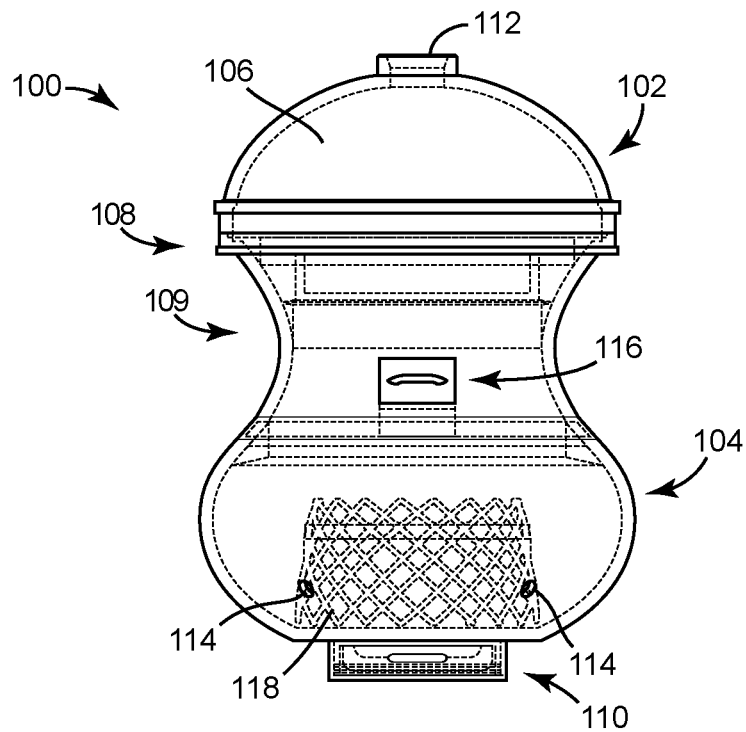
FIG. 1 is a front elevation view of a barbecue smoker cooking apparatus with a refuel chute, according to an exemplary embodiment.
Figure 2:
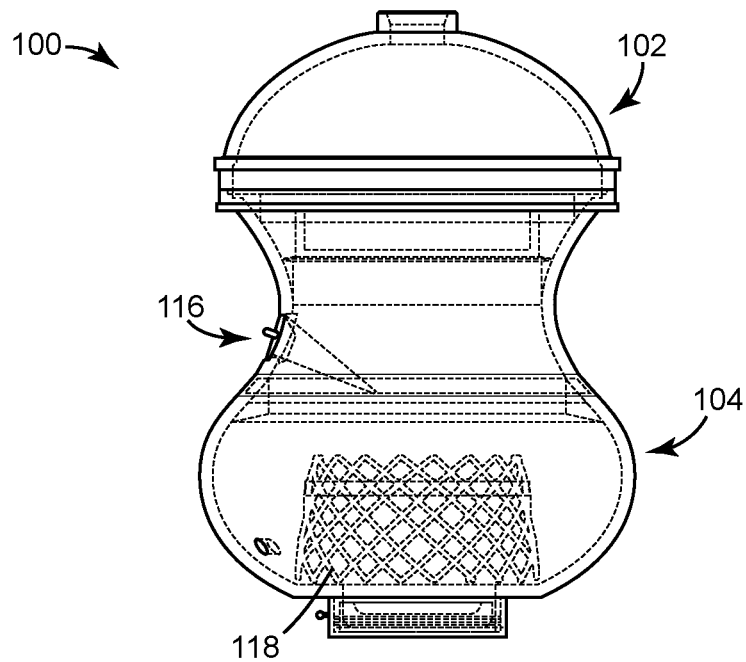
FIG. 2 is a side elevation view of the barbecue smoker cooking apparatus of FIG. 1, according to an exemplary embodiment.

Referring now to FIGS. 1-2, a barbecue smoker cooking apparatus 100 is shown, according to an exemplary embodiment. The apparatus 100 includes a container body having an upper portion 102 and a lower portion 104. In various embodiments, the cooking apparatus 100 is a type of smoker often referred to as a kamado smoker, and upper portion 102 and lower portion 104 are substantially constructed from a heat-retaining material (e.g., ceramic, cast iron) that permit the cooking apparatus 100 to store heat during long cooking periods (e.g., in excess of 12 hours).

A food platform 108 is disposed between the upper portion 102 and the lower portion 104 to retain food within cooking apparatus 100 during the cooking process. Food platform 108 may be any suitable structure for smoking and/or grilling food, such as a grill grate, a grill basket, or a spit. In some embodiments, cooking apparatus 100 also includes a water container 109 below the food platform 108 that provides moisture to the food cooking on the food platform 108. Providing moisture to food may allow the food to absorb more smoke, as the moisture is believed to form a boundary layer around the food that limits the ability of the smoke to flow past the food.

Food platform 108 may be enclosed by a cover 106 with an upper vent 112. Cover 106 may be removably coupled to cooking apparatus 100 such that food and/or water may be added to and removed from apparatus 100. Upper vent 112 may operate as an air outlet at the top of cooking apparatus 100 to allow air and smoke to escape. In some embodiments, the size of upper vent 112 may be configurable by a user to ensure optimal cooking conditions.

The lower portion 104 of cooking apparatus 100 includes a heat source 110, lower vents 114, a fuel chute 116, and a fuel container 118. Heat source 110 may be any type of appropriate heat source, such as a coal, wood, propane, or natural gas burner. One or more lower vents 114 may be disposed symmetrically around lower portion 104 to permit air to flow controllably into heat source 110. Fuel container 118 may be any suitable container, basket, or shroud structure that retains fuel for the heat source 110. For example, the fuel may be wood or charcoal pellets, other suitable fuel. In various embodiments, the fuel container 118 may be metal or any other suitable material. As shown in FIGS. 1-2, fuel container 118 may be a circular mesh basket that retains fuel in the center of lower portion 114. In other embodiments, the fuel container 118 is configured for a single use, and is fabricated from the same type of wood as the fuel (e.g., mesquite wood, apple wood, cherry wood, etc.).

Figure 3:
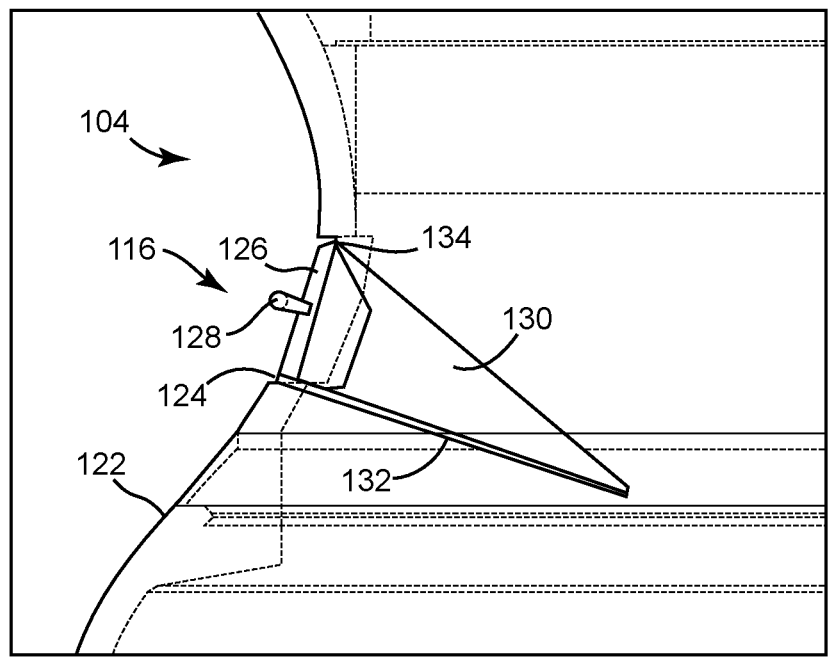
FIG. 3 is a detail view of the lower portion of the barbecue smoker cooking apparatus of FIG. 1, according to an exemplary embodiment.

Turning now to FIG. 3, a detail view of the lower portion 104 of cooking apparatus 100 including the fuel chute 116 is depicted, according to an exemplary embodiment. As shown, the fuel chute 116 includes a door panel 126 coupled to a pair of side panels 130 and a back panel 130. Door panel 126 is rotatably coupled to the wall 122 of the lower portion 104 via a hinge mechanism 124. Hinge mechanism 124 is configured to permit fuel chute 116 to rotate between an open position and a closed position, as described in greater detail below with reference to FIGS. 5A-5C. The hinge mechanism 124 may be any type of suitable hinge (e.g., a piano hinge, a butt hinge, a concealed hinge, a flag hinge, etc.). In some embodiments, hinge mechanism 124 includes a spring mechanism (e.g., a torsion spring) configured to bias the fuel chute 116 toward a closed position, although the weight of the fuel chute 116 may also be sufficient to achieve this bias. In some embodiments, the door panel 126 further includes a latching mechanism (not shown) to retain the door panel 126 in the closed position. In still further embodiments, a thermal gasket 134 of thermally insulating material may be located between the wall 122 of the lower portion 104 and the door panel 126 to prevent heat leakage around the fuel chute 116 in the closed position.

Fuel chute 116 is additionally shown to include a handle or opening mechanism 128 coupled to the door panel 126. In order to operate the fuel chute 116, a user may grasp the handle 128 and rotate the door panel 126 toward the user, which in turn rotates the coupled side panels 130 and back panel 132 at least partially outside of the lower portion 104. In various embodiments, handle 128 may be fabricated from a thermally insulated material or may be otherwise thermally isolated from the door panel 126 to ensure there is no burn hazard to a user.

In some embodiments, fuel chute 116 contains a scale device (not shown) configured to permit a user to gauge the amount of fuel being supplied to the cooking apparatus 100 during a refueling process. For example, in one embodiment, fuel chute 116 may be sized to receive a maximum load of approximately 2 kg of fuel, permitting the cooking apparatus 100 to be fully refueled in two loads. Minimizing the amount of times fuel chute 116 is opened during a cooking process may have a substantial beneficial effect on the quality of the cooking process by minimizing the amount of ambient air that is permitted to flow into cooking apparatus 100.

Figure 4:
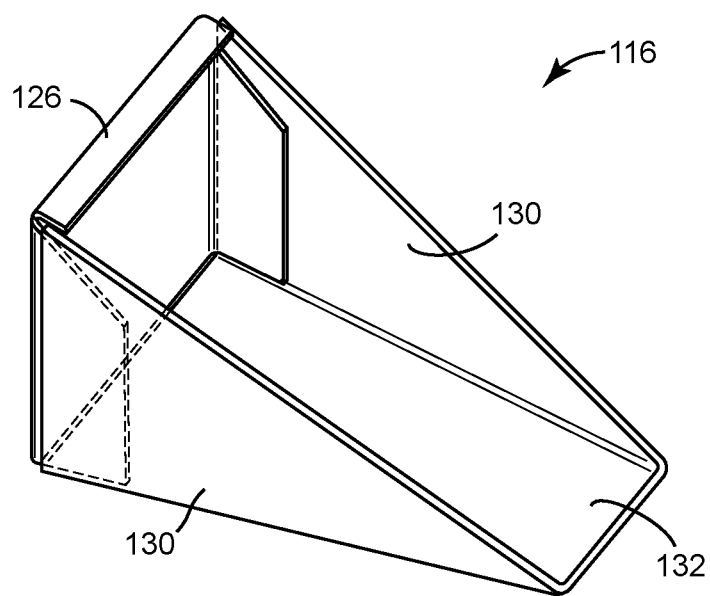
FIG. 4 is a perspective view of the refuel chute, according to an exemplary embodiment.

Referring now to FIG. 4, a perspective view of fuel chute 116 is depicted according to an exemplary embodiment. As described above with reference to FIG. 3, fuel chute 116 includes a door panel 126, side panels 130 located at each side of door panel 126, and a back panel 132 that is coupled to the door panel 126 and the side panels 130. Collectively, door panel 126, side panels 130, and back panel 132 form a receptacle to receive a supply of fuel during a refueling process and direct the fuel into the fuel basket 118. In various embodiments, door panel 126 may be fabricated from the same heat-insulating material as the upper portion 102 and the lower portion 104 of the container (e.g., ceramic material, cast iron) to ensure a contiguous appearance to the exterior of cooking apparatus 100. Side panels 130 and back panel 132 may be fabricated from one or more pieces of a sheet metal material, such as stainless steel or other suitable material.

Figure 5A:
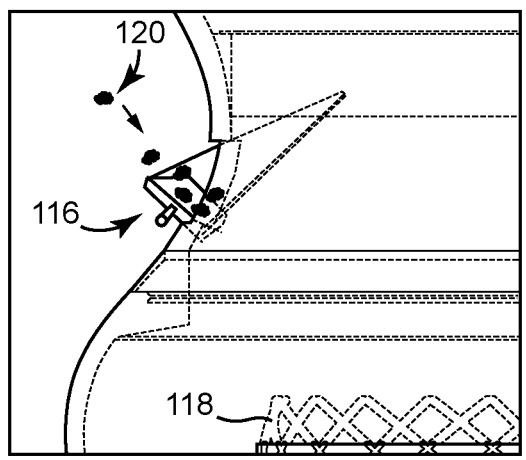
FIGS. 5A-5C are a series of detail views of a process for refueling the barbecue smoker cooking apparatus of FIG. 1, according to an exemplary embodiment.
Figure 5B:
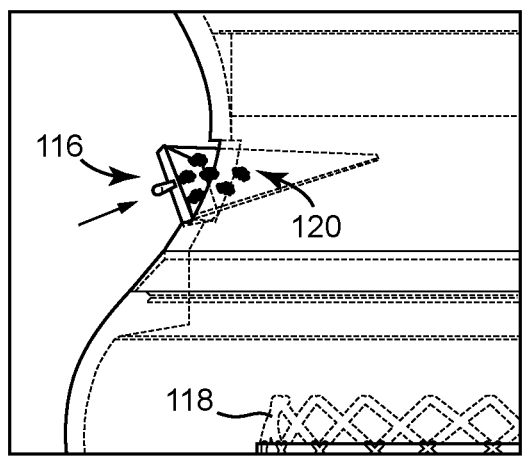
Figure 5C:
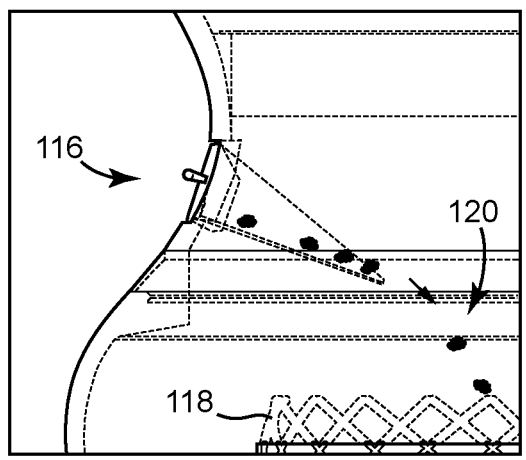

FIGS. 5A-5C depict a series of detail views of the barbecue smoker cooking apparatus 100 in various stages of the refueling process, according to an exemplary embodiment. Referring specifically to FIG. 5A, fuel chute 116 is depicted in the open position. In the open position, door panel 126 is rotated outwards from the wall 122 and the back panel 132 is in an upwardly extending position relative to the hinge and a horizontal plane, allowing a supply of fuel 120 to be deposited by a user into the receptacle formed by door panel 126, side panels 130, and back panel 132. The upwardly extending position of the back panel 132 also blocks or reduces an external airflow from entering the cooking apparatus 100. This prevents or reduces both temperature surges due to a sudden influx of oxygen to the heat source 110 and temperature drops due to a sudden influx of colder air into the cooking apparatus 100 from the ambient environment. The angle of back panel 132 in the open position may be any angle suitable to reliably receive the supply of fuel 120 and substantially block airflow from the ambient environment (e.g., between 10° above horizontal and 90° above horizontal).

In FIG. 5B, fuel chute 116 is depicted in a partially closed position. In the partially closed position, back panel 132 is in a roughly horizontal position and the supply of fuel 120 remains retained with the receptacle formed by door panel 126, side panels 130, and back panel 132. Finally, in FIG. 5C, fuel chute 116 is depicted in the closed position. In the closed position, back panel 132 extends downwardly, relative to the hinge and a horizontal plane, toward the fuel basket 118 to direct the supply of fuel 120 to slide down the back panel 132 and into the fuel basket 118. The angle of back panel 132 in the closed position may be any angle suitable to reliably direct the supply of fuel 120 into the fuel basket 118 (e.g., between 10° below horizontal and 70° below horizontal).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the automotive door hinge as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., door component, hinge component, pivot pin, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A barbecue smoker device for cooking food, the barbecue smoker device comprising:
   a container;
   a heat source disposed in the container;
   a fuel chute coupled to the container, wherein the fuel chute comprises:
      a door panel;
      a hinge mechanism;
      a back panel coupled to the door panel;
   wherein the fuel chute is rotatable between an open position and a closed position, the open position configured to receive a supply of fuel within the fuel chute and the closed position configured to direct the supply of fuel to a fuel basket and
   wherein the fuel chute further comprises a side panel coupled to each side of the door panel.

2. The barbecue smoker device of claim 1, wherein the container comprises an upper portion and a lower portion.

3. The barbecue smoker device of claim 2, further comprising a food platform disposed between the upper portion and the lower portion of the container.

4. The barbecue smoker device of claim 2, wherein the heat source is disposed in the lower portion of the container.

5. The barbecue smoker device of claim 4, wherein the fuel basket is disposed in the lower portion of the container between the food platform and the heat source.

6. The barbecue smoker device of claim 1, wherein the back panel is coupled to the door panel and the side panels.

7. The barbecue smoker device of claim 5, wherein, in the closed position, the back panel extends downwardly from the hinge mechanism toward the fuel basket.

8. The barbecue smoker device of claim 1, wherein, in the open position the back panel extends upwardly from the hinge mechanism to define, with the side panels and the door panel, a receptacle to receive the supply of fuel.

9. The barbecue smoke device of claim 8, wherein the back panel in the upwardly extending position is configured to substantially block air from flowing into the container when the fuel chute is in the open position.

10. The barbecue smoker device of claim 2, further comprising at least one of an upper vent disposed in the upper portion and a lower vent disposed in the lower portion.

11. The barbecue smoker device of claim 3, further comprising a water container configured to retain water in a location proximate to the food platform.

12. The barbecue smoker device of claim 1, wherein the supply of fuel comprises at least one of charcoal and wood.

13. The barbecue smoker device of claim 1, wherein the fuel chute further comprises a handle mechanism configured to permit a user to rotate the fuel chute between the open position and the closed position.

14. The barbecue smoker device of claim 1, wherein the fuel chute further comprises a latch mechanism configured to retain the door panel of the fuel chute in a closed configuration.

15. The barbecue smoker device of claim 1, wherein the fuel chute further comprises thermal gasket material located proximate to the door panel of the fuel chute and configured to retain heat within the container.

16. The barbecue smoker device of claim 1, wherein the fuel chute further comprises a scale device configured to weigh the supply of fuel within the fuel chute.

17. The barbecue smoker device of claim 1, wherein the fuel chute further comprises a spring coupled to the door panel and configured to bias the fuel chute toward the closed position.

18. A device for cooking food, the device comprising:
   a container body having an upper portion and a lower portion;
   a heat source disposed in the lower portion of the container body;
   a fuel chute coupled to the container body, wherein the fuel chute comprises:
      a door panel;
      a hinge mechanism;
      a back panel coupled to the door panel;
   wherein the fuel chute is rotatable between an open position and a closed position, the open position configured to receive a supply of fuel within the fuel chute and in the closed position the back panel extends downwardly toward the fuel basket and is configured to direct the supply of fuel to a fuel basket disposed in the lower portion between the food platform and the heat source.

19. A device for cooking food, the device comprising:
   a container body;
   a heat source disposed in the container body;
   a fuel chute coupled to the container body, wherein the fuel chute comprises:
      a door panel;
      a hinge mechanism;
      a back panel coupled to the door panel;

wherein the fuel chute is rotatable between an open position and a closed position, so that in the open position the back panel extends upwardly from the hinge mechanism to define, with the side panels and the door panel, a receptacle to receive the supply of fuel, and in the closed position the receptacle is configured to direct the supply of fuel to a fuel basket.

20. A device for cooking food, the device comprising:
a container body having an upper portion and a lower portion;
a food platform disposed between the upper portion and the lower portion;
a water container configured to retain water in a location proximate to the food platform;
a heat source disposed in the container body;
a fuel chute coupled to the container body, wherein the fuel chute comprises:
    a door panel;
    a hinge mechanism;
    a back panel coupled to the door panel;
wherein the fuel chute is rotatable between an open position and a closed position, the open position configured to receive a supply of fuel within the fuel chute and the closed position configured to direct the supply of fuel to a fuel basket.

21. A device for cooking food, the device comprising:
a container body;
a heat source disposed in the container body;
a fuel chute coupled to the container, wherein the fuel chute comprises:
    a door panel;
    a hinge mechanism;
    a back panel coupled to the door panel;
    a thermal gasket material located proximate to the door panel of the fuel chute and configured to retain heat within the container body;
wherein the fuel chute is rotatable between an open position and a closed position, the open position configured to receive a supply of fuel within the fuel chute and the closed position configured to direct the supply of fuel to a fuel basket.

22. A device for cooking food, the device comprising:
a container body;
a heat source disposed in the container body;
a fuel chute coupled to the container body, wherein the fuel chute comprises:
    a door panel;
    a hinge mechanism;
    a back panel coupled to the door panel;
    a scale device configured to weigh the supply of fuel within the fuel chute;
wherein the fuel chute is rotatable between an open position and a closed position, the open position configured to receive a supply of fuel within the fuel chute and the closed position configured to direct the supply of fuel to a fuel basket.

23. A device for cooking food, the device comprising:
a container body;
a heat source disposed in the container body;
a fuel chute coupled to the container body, wherein the fuel chute comprises:
    a door panel;
    a hinge mechanism;
    a back panel coupled to the door panel;
    a spring coupled to the door panel and configured to bias the fuel chute from an open position toward a closed position;
wherein the fuel chute is rotatable between the open position and the closed position, the open position configured to receive a supply of fuel within the fuel chute and the closed position configured to direct the supply of fuel to a fuel basket.

* * * * *